(12) United States Patent
Terwilliger et al.

(10) Patent No.: US 10,402,781 B2
(45) Date of Patent: Sep. 3, 2019

(54) MULTIDIMENSIONAL BARCODES FOR INFORMATION HANDLING SYSTEM SERVICE INFORMATION

(75) Inventors: Kevin Terwilliger, Austin, TX (US); Scott Lauffer, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 531 days.

(21) Appl. No.: 13/233,376

(22) Filed: Sep. 15, 2011

(65) Prior Publication Data

US 2013/0069794 A1 Mar. 21, 2013

(51) Int. Cl.
| | |
|---|---|
| *G06K 7/10* | (2006.01) |
| *G06K 9/22* | (2006.01) |
| *G06Q 10/10* | (2012.01) |
| *G06Q 10/08* | (2012.01) |
| *G06F 16/955* | (2019.01) |

(52) U.S. Cl.
CPC ......... *G06Q 10/10* (2013.01); *G06F 16/9554* (2019.01); *G06Q 10/08* (2013.01)

(58) Field of Classification Search
CPC ......... G06F 17/30879; G06F 17/30047; G06F 2203/04109; G06F 3/017; G06F 3/0416; G06F 3/0425; G06F 3/04883; G06F 16/9554; G09G 3/001; G09G 3/006; G09G 2300/026; G09G 2320/0295; G09G 2320/04; G09G 2320/0693; G09G 2330/12; G09G 2340/12; G09G 2360/148; G09G 3/00; G09G 3/2085; G09G 3/32; G09G 3/3208; G09G 5/003; G09G 5/377; G06T 11/00; G06Q 10/10; G06Q 10/08

USPC ...... 235/462.01, 462.45, 383, 375; 714/760; 399/8; 358/1.14; 348/333.01, 211.1; 345/83

See application file for complete search history.

(56) References Cited

U.S. PATENT DOCUMENTS

| | | | |
|---|---|---|---|
| 4,958,064 | A | 9/1990 | Kirkpatrick |
| 5,502,814 | A | 3/1996 | Yuuki et al. |
| 5,636,008 | A | 6/1997 | LoBiondo et al. |
| 5,668,696 | A | 9/1997 | Schmitt |
| 5,979,757 | A * | 11/1999 | Tracy et al. ................... 235/383 |
| 6,036,087 | A | 3/2000 | Hong et al. |
| 6,233,408 | B1 * | 5/2001 | Allen ................................ 399/8 |
| 6,525,698 | B1 * | 2/2003 | Takechi et al. ............ 235/462.1 |
| 6,997,384 | B2 | 2/2006 | Hara |
| 7,591,383 | B1 | 9/2009 | Milton |
| 2002/0095487 | A1 | 7/2002 | Day et al. |
| 2003/0061312 | A1 | 3/2003 | Bodner et al. |

(Continued)

FOREIGN PATENT DOCUMENTS

JP 2005346577A A 12/2005

*Primary Examiner* — Thien T Mai
(74) *Attorney, Agent, or Firm* — Zagorin Cave LLP; Robert W. Holland

(57) ABSTRACT

Multi-dimensional barcodes at a product include service identifiers for the product so that an end user with a portable information handling system captures an image of the multi-dimensional barcode and extracts the service identifiers to obtain service information from a service network location. For example, a service identifier embeds a URL that links to a video demonstrating how to assemble the product. As another example, a service identifier links to a service network location and includes a unique identifier so that an end user retrieves warranty or purchase information for the product.

19 Claims, 4 Drawing Sheets

(56) References Cited

U.S. PATENT DOCUMENTS

| | | |
|---|---|---|
| 2003/0128174 A1* | 7/2003 | Scheibe .......................... 345/83 |
| 2003/0213839 A1* | 11/2003 | Riggert et al. ................ 235/375 |
| 2004/0178270 A1 | 9/2004 | Pradhan et al. |
| 2007/0084978 A1 | 4/2007 | Martin et al. |
| 2008/0218437 A1 | 9/2008 | Shimoi |
| 2009/0108057 A1 | 4/2009 | Mu et al. |
| 2009/0289764 A1 | 11/2009 | Chiu |
| 2010/0057900 A1 | 3/2010 | Ootsuka |
| 2010/0149355 A1* | 6/2010 | Koshiba et al. ........... 348/211.1 |
| 2010/0225653 A1 | 9/2010 | Sao et al. |
| 2010/0261502 A1* | 10/2010 | Martin-Cocher et al. ................... 235/462.01 |
| 2011/0069049 A1 | 3/2011 | Wong et al. |
| 2011/0085196 A1 | 4/2011 | Liu et al. |
| 2011/0085732 A1 | 4/2011 | Cheng |
| 2011/0164163 A1* | 7/2011 | Bilbrey et al. ........... 348/333.01 |
| 2011/0218730 A1 | 9/2011 | Rider et al. |
| 2011/0241833 A1 | 10/2011 | Martin et al. |
| 2012/0008161 A1 | 1/2012 | Rouhana |
| 2012/0026530 A1* | 2/2012 | Tsongas et al. .............. 358/1.14 |
| 2012/0131416 A1* | 5/2012 | Dugan et al. ................. 714/760 |
| 2012/0175412 A1 | 7/2012 | Grabiner et al. |
| 2012/0194547 A1* | 8/2012 | Johnson ................. G06T 11/00 345/632 |
| 2012/0194854 A1 | 8/2012 | Tang et al. |
| 2012/0258715 A1 | 10/2012 | Souissi et al. |
| 2012/0303323 A1 | 11/2012 | Ha et al. |
| 2012/0329386 A1 | 12/2012 | Reyner |
| 2013/0032634 A1 | 2/2013 | McKirdy |
| 2013/0069781 A1 | 3/2013 | Terwilliger et al. |
| 2013/0110682 A1 | 5/2013 | Rosenblatt et al. |
| 2014/0129882 A1 | 5/2014 | Harden et al. |
| 2014/0203071 A1 | 7/2014 | Eggert |
| 2015/0161495 A1 | 6/2015 | Rodriguez et al. |

* cited by examiner

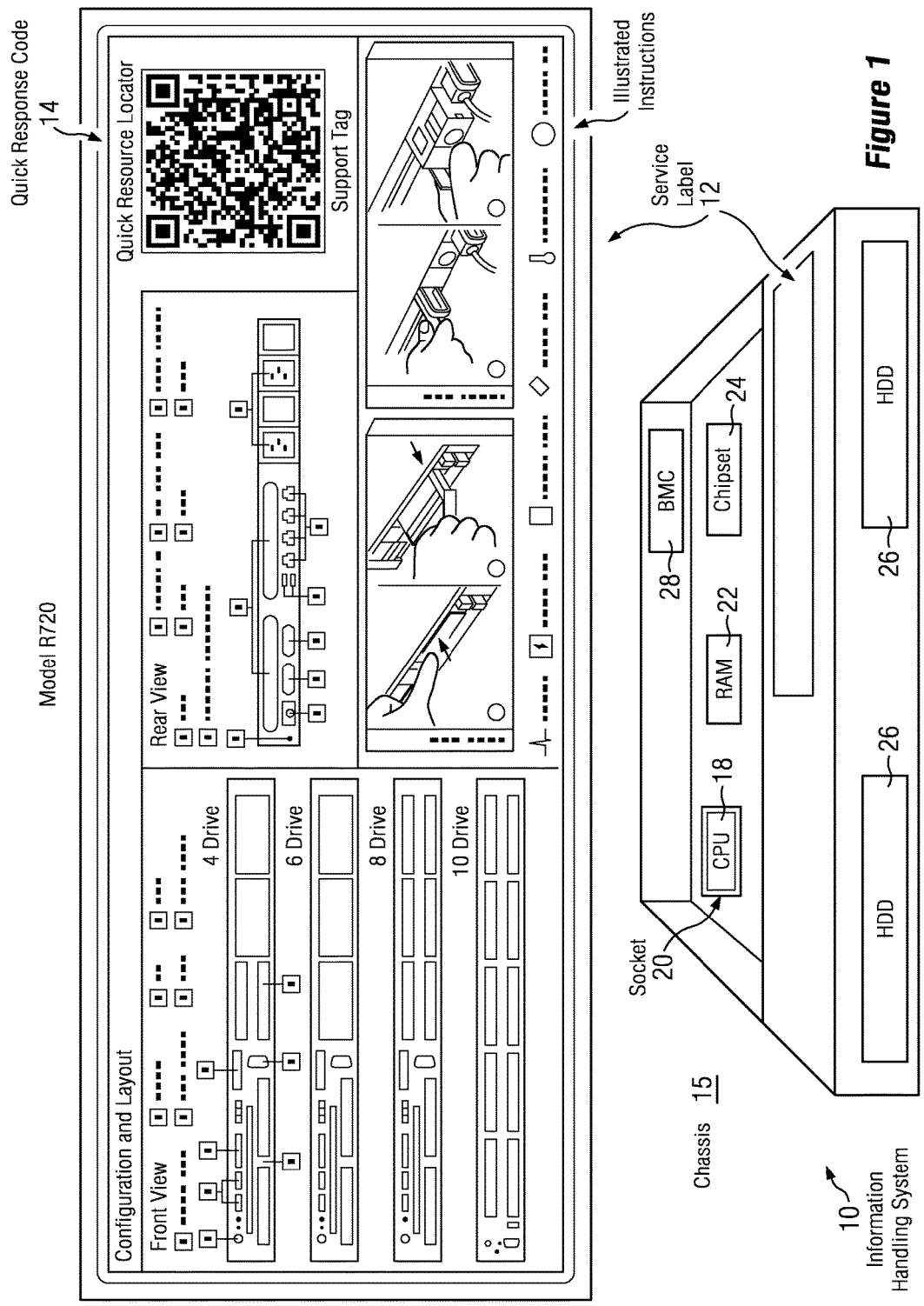

MULTIDIMENSIONAL BARCODES FOR INFORMATION HANDLING SYSTEM SERVICE INFORMATION

CROSS REFERENCE TO RELATED APPLICATIONS

U.S. patent application Ser. No. 13/233,433, entitled "Dynamic Multidimensional Barcodes For Information Handling System Service Information," inventors Kevin Terwilliger, Scott Lauffer, Pankaj Bishnoi, and Bradley Lawrence, filed Sep. 15, 2011, describes exemplary methods and systems and is incorporated by reference in its entirety.

U.S. patent application Ser. No. 13/233,478, entitled "Multidimensional Barcodes For Information Handling System Manufacture, Assembly And Service," inventors Kevin Terwilliger and Scott Lauffer, filed Sep. 15, 2011, describes exemplary methods and systems and is incorporated by reference in its entirety.

BACKGROUND OF THE INVENTION

Field of the Invention

The present invention relates in general to the field of information handling system service, and more particularly to multidimensional barcodes for information handling system service information.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Individuals and enterprises rely on a wide variety of information handling systems to create, use and manage information. For example, enterprises typically have a number of server information handling systems that support employees and interface with customers. Employees typically have fixed and/or portable information handling systems that interface as clients to enterprise servers to perform job functions, such as word processing, presentations and communications. Individuals often interface with enterprises to shop or make purchases by contacting enterprise servers through the Internet using fixed and/or portable information handling systems. Wireless networking through local area networks, such as wireless hotspots, or wide area networks, such as cellular phone networks, have allowed end users to interact with an enterprise's servers through the Internet from any number of physical locations. Portable information handling systems have decreased in size to the point where end user's will carry a portable system in a pants pocket for ready access to information through the Internet at virtually any time and any location.

Increased reliance on information handling systems has made operational reliability an important consideration for enterprises in their selection and maintenance of information handling systems. Enterprises typically maintain an information technology staff to ensure information handling system resources remain operational in a reliable manner. To aid information technology professionals with this maintenance, information handling system manufacturers will often include information labels on a system chassis that provide service information, such as steps for changing a processor, hard disk drive or RAM module. The service information posted on a label at a server chassis is readily available for review by an information technology professional during access to an information handling system disposed in the chassis, however, the amount of space for printing on the label is generally restricted so that only limited service information is presented. Service information on a chassis label is often inadequate in the quantity and quality of information available for review by an end user. When service information is inadequate, end users will turn to other resources, such as calling a manufacturer representative who can talk the end user through service steps. Such service calls increase manufacturer expense and tend to consume considerable time of the enterprise information technology professional while he locates the right person to talk with, explains the problem, and performs the solution. Alternatives, such as self-help through Internet resources, tend to be more efficient and effective service resources for most issues, however, the information technology professional must find and review the correct resource in order to take the proper service actions. Often this means inputting system information into the website to identify the type of information handling system, search for the proper fault information and track down warranty coverage.

SUMMARY OF THE INVENTION

Therefore a need has arisen for a system and method which directs an end user performing service at an information handling system to resources that aid the correct service actions for the particular information handling system and the service function involved in the service.

In accordance with the present invention, a system and method are provided which substantially reduce the disadvantages and problems associated with previous methods and systems for providing service to an information handling system. Multi-dimensional barcodes embed one or more service identifiers that are accessible by an analysis of an image taken of the barcode at a portable information handling system. The service identifier is applied to retrieve service information to the portable information handling system for presentation to an end user.

More specifically, an end user captures an image of a quick response (QR) code from an information handling system service label with a smart phone and analyzes the QR code at the smart phone to extract one or more service identifiers embedded in the QR code. The end user then applies the service identifiers to obtain service information to aid in the performance of a service function at the information handling system. For example, a QR code on a service label attached to an information handling system chassis embeds a URL that loads a service web page for the model type of the information handling system to a browser of the smart phone. The service webpage is provided from a service network location and includes service information, such as a user manual for the model, videos demonstrating service functions like replacement of CPUs and hard disk drives, assembly instructions, audio instructions for performing service functions and pictures that show the functional parts of the information handling system. Additional service identifiers included in the QR code or in other QR codes include a unique identifier of the information handling system that allows retrieval of warranty and repair information. For example, based upon a service level purchased by the end user as determined from the service identifier, the user is automatically interfaced with a call center, or forwarded to a service network location that performs diagnostics at the information handling system to automatically order replacement parts for components detected as failures. In one embodiment, a dynamic display presents a QR code with electronic paper or an LED display to allow an end user to extract the results of diagnostics run on the information handling system from the dynamically-generated QR code.

The present invention provides a number of important technical advantages. One example of an important technical advantage is that service is rapidly and accurately supported at an information handling system by providing the identification and location of an information handling system under service to a service location to obtain correct service information for the information handling system. Service information is quickly and rapidly conveyed to an end user through an information handling system with multimedia communications techniques, such as an instructional video. Service labels on an information handling system are simplified to have a multidimensional barcode, such as a quick response code label, that is readily converted into service information through an Internet resource. Simplified service labels reduce manufacture cost and provide an improved customer experience with more rapid, up-to-date and relevant service information. In one embodiment, specific fault information is provide with a presentation device that generates quick response tags, such as electronic ink, LED or similar display devices. In addition, warranty and other product information presented with a quick response code label help to ensure that correct service levels are provided to an end user who initiates a service inquiry with a quick response code label.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIG. 1 depicts an information handling system having a service label with a multi-dimensional barcode that aids access to service information;

DETAILED DESCRIPTION

Figures 2A, 2B, 2C:
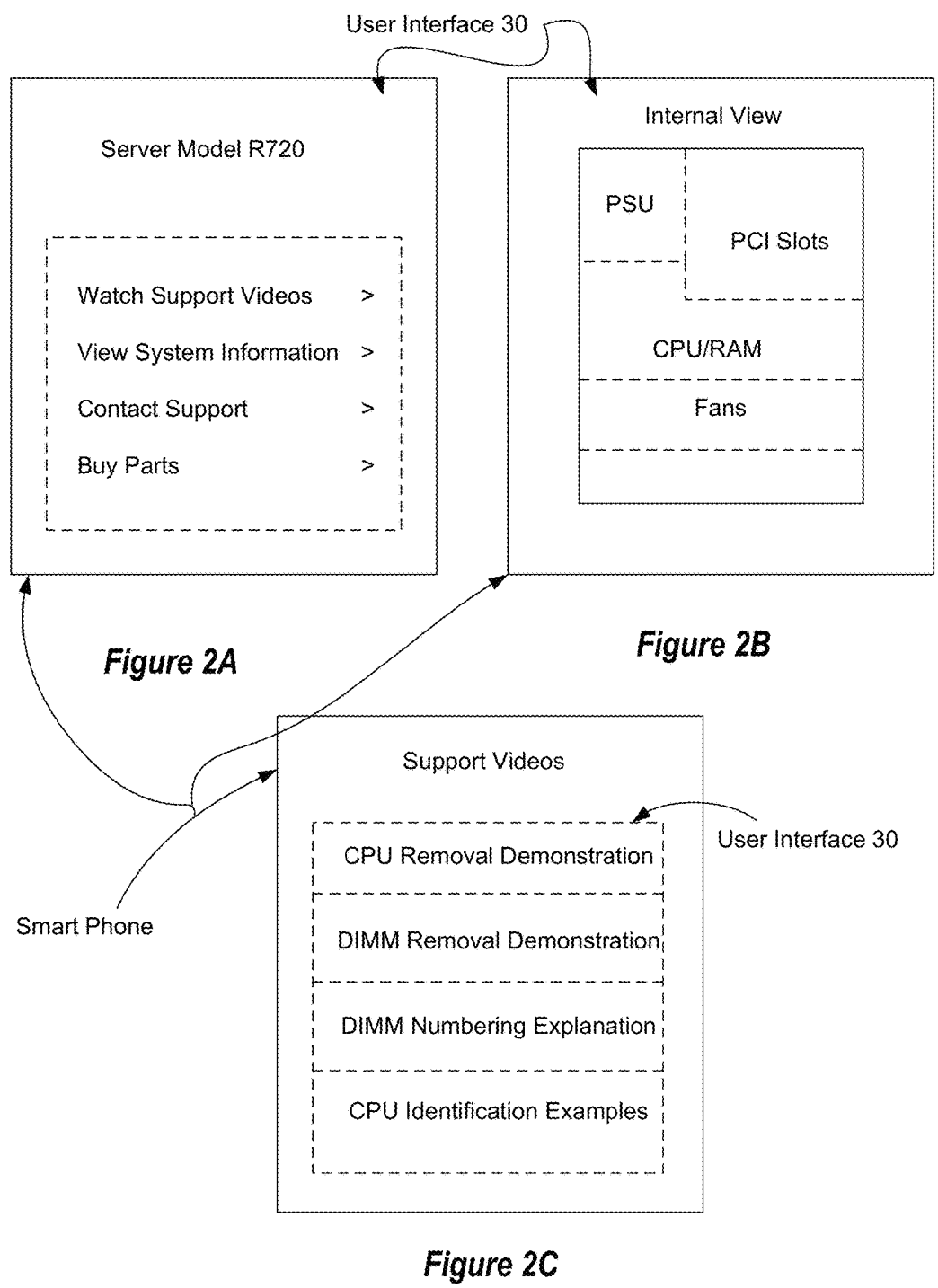
FIGS. 2A, 2B and 2C depict example user interfaces presented at a portable wireless telephone interfaced with a service network location.

Quick response codes at information handling systems provide rapid access to service information, such as for maintenance and repair functions, by providing access to a service identifier through a portable telephone application that presents video demonstrations of the service function. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Referring now to FIG. 1, an information handling system 10 is depicted having a service label 12 with a multi-dimensional barcode 14 that aids access to service information. Information handling system 10 processes information with plural components disposed in a chassis 15, such as one or more CPUs 18 installed in sockets 20, RAM 22, a chipset 24, a hard disk drive 26 and a baseboard management controller 28. For example, an operating system and applications imaged to hard disk drive 26 are executed on CPU 18 to perform processing functions, such as serving information to clients or word processing.

Information handling system 10 has a service label 12 affixed to chassis 15 in a position accessible by an end user. Service label 12 includes instructions that describe service information for information handling system 10, such as pictures that show insertion and removal of a hard disk drive 26 at chassis 15, replacement of a CPU 18 in a socket 20 or similar service functions. Service label 12 includes a multi-dimensional barcode 14 that embeds a service identifier associated with service information for information handling system 10. In the example embodiment depicted by FIG. 1, multi-dimensional barcode 14 is a quick response (QR) code, a type of matrix barcode introduced in 1994 and readable by dedicated QR barcode readers. QR codes are also readable by portable information handling systems, such as smart phones, that include a camera and a barcode application, such as is available at www.gettag.mobi. QR code 14 on service label 12 includes service information in the form of text, a universal resource locator (URL) or other data. End user's can extract information embedded in the QR code by taking an image of the QR code with a portable information handling system camera and analyzing the image with a barcode application.

In the example embodiment of FIG. 1, QR code 14 enriches the content presented at service label 12 to aid with service of information handling system 10 while reducing the size and complexity of service label 12. For example, QR code 14 on service label 12 provides a URL link to digital content about the specific model type to which service label 12 is attached, such as service videos, configuration wizards and user manual content. An end user takes an image of QR code 14 with a camera on a smart phone or laptop and analyzes the image with a barcode application to extract a URL associated with service information for the model type, in this case the model R720, such as the URL www.Dell/Service/QR/R720 for a service network location of the model R720. Once the URL is extracted, a browser on the smart phone or laptop allows the end user to visit the service network location for the information handling system model type as provided by the URL to obtain service information for the information handling system model type. In one embodiment, QR code 14 includes a unique identifier for the information handling system so that the end user can provide the unique identifier to the service network location and obtain service information on an individual basis for the information handling system rather than based on model type. For example, the unique identifier provides access to warranty, original configuration and original image information for the information handling system that has the service label 12, as well as other product specific service information. In one embodiment, an end user loads a service application on the portable information handling system that reads the QR code so that the service application can automatically initiate a service session with the service network location using the unique identifier and password protection available through the service application.

Referring now to FIGS. 2A, 2B and 2C, example user interfaces presented at a portable wireless telephone interfaced with a service network location are depicted. An end user captures an image of QR code 14 to extract a URL that opens a browser to the user interface 30 depicted by FIG. 2A. User interface 30 presents support options available to the end user for the information handling system associated with the service label QR code, such as watching support videos that demonstrate a support function or operation, viewing system information, contacting support or buying spare parts. Service information extracted from QR code 14 can aid in the selection of desired service information by automatically inserting into fields of user interface 30 to extract desired service network location content. For instance, information handling system 10 can include multiple QR codes with a unique identifier for the information handling system and an associated component identifier so that a video that demonstrates replacement of the component is automatically presented. In one example embodiment, a QR code near the CPU 18 or socket 20 will include embedded service information that user interface 30 applies to automatically present a video demonstrating replacement of the component. Alternatively, an end user can select the "View System Information" tab of user interface 30 to view an image of the components disposed on the motherboard of information handling system 10 as presented by the user interface of FIG. 2B. From the image presented by FIG. 2B, the end user can select "CPU/RAM" to view the user interface of FIG. 2C, which depicts videos demonstrating CPU removal, RAM DIMM removal, DIMM numbering and CPU identification.

The presentation of service information may proceed automatically based upon service information extracted from a QR code or manually based upon end user inputs, such as a unique identifier or password input at the user interface. Smart phone capabilities are leveraged to provide ready access by an end user to additional services and service information. For example, rather than manually inputting a telephone number to contact a telephone service center, a telephone number is automatically dialed by the smart phone based upon a telephone number extracted from the QR code or based upon a telephone number provided from the service network location using warranty or service level information derived from service information extracted from the QR code, such as a unique identifier. Alternatively, a text chat session with a support center is automatically initiated. As another example, an end user is presented with parts for purchase that are compatible with information handling system 10 by reference to service information extracted from QR code 14 and forwarded to a service network location, such as a unique identifier of information handling system 10 embedded in QR code 14 along with a service network location URL. Before completing a replacement or repair part order, the service information as applied by the service network location enables a remote access to the information handling system to complete a system diagnostics that confirms failure of a component. Although the example embodiment presents service information for an information handling system, in alternative embodiments, service to other types of products may be supported. For example, a QR code on a car spare tire can automatically retrieve a video through a smart phone that demonstrates changing the spare tire.

Figure 3:
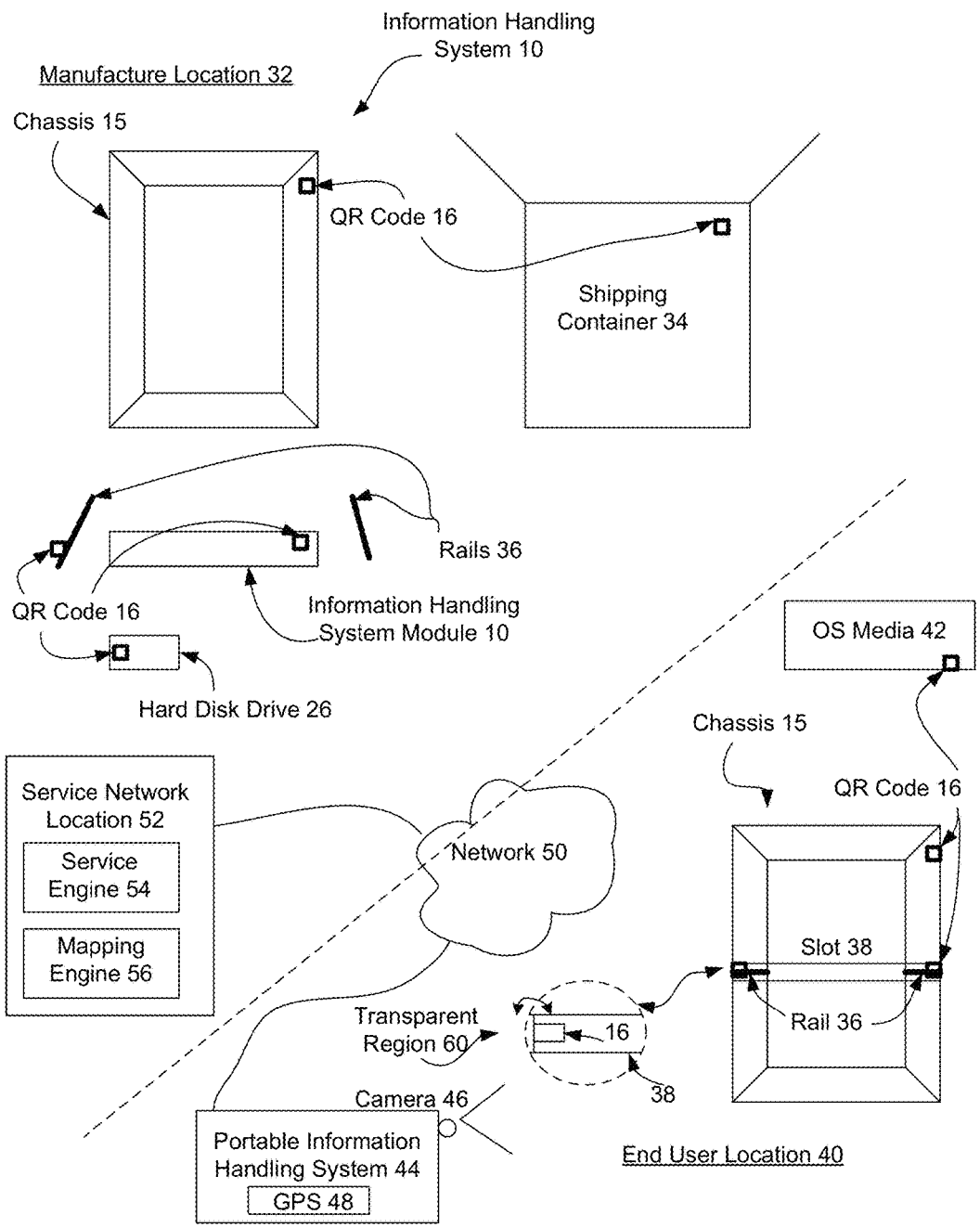
FIG. 3 depicts a block diagram of tracking manufacture and assembly of information handling system components with multi-dimensional barcode.

Referring now to FIG. 3, a block diagram depicts tracking manufacture and assembly of information handling system components with multi-dimensional barcodes. Service and assembly information content of a service label is enhanced by adding on-line digital content to service label printed instructional material. Enhanced content is accessible by a smart phone or laptop that has a camera to capture a QR code image, such as QR codes otherwise used during the manufacture process. Individual product unique codes link an end user to a "personal" service website that depicts the unique system ordered by the end user, suggests repairs, maintenance and upgrades to that unique system, and tracks updates that are performed. QR codes on the products, components within the products and packaging used to ship the products conveniently tie operation of the product with services from ordering and manufacture to product end of life. For example, an end user seeking to replace a product images the legacy product's QR code to locate an order site that displays the legacy configuration model type and suggests upgrades and services associated with the product. This allows ordering, billing, tracking and inventory of a replacement product tied to the end user's account by the legacy QR code.

During manufacture at a manufacture location 32, an information handling system 10 and its components have QR codes 14 attached with service identifiers to aid in the manufacture, delivery and subsequent service of the information handling system. For example, a QR code 14 is tooled into a portion of an information handling system chassis 15 or attached as a label to a shipping box 34 to provide service information for an information handling system order, such as the contents of a shipment for delivery confirmation and inventory control. As another example, a QR code is attached to a hard disk drive 26 intended as a component of an information handling system 10 to provide access to drive specific information on line, such as life cycle, usage, drive type or the image originally loaded on the drive that provides an operating system for booting the information handling system. As another example, a QR code is attached to removable parts of the information handling system, such as bezels, rails 36 and storage devices 26, to tie the removable parts to the information handling system 10 and to allow access on-line to instructions for assembly of the parts. Pre-printed unique QR codes linked to an information handling system configuration are applied to the components and the shipping materials during assembly of the information handling system so that the QR codes are available after delivery of the information handling system for use by an end user in the assembly and service of the information handling system and components.

Figure 4:
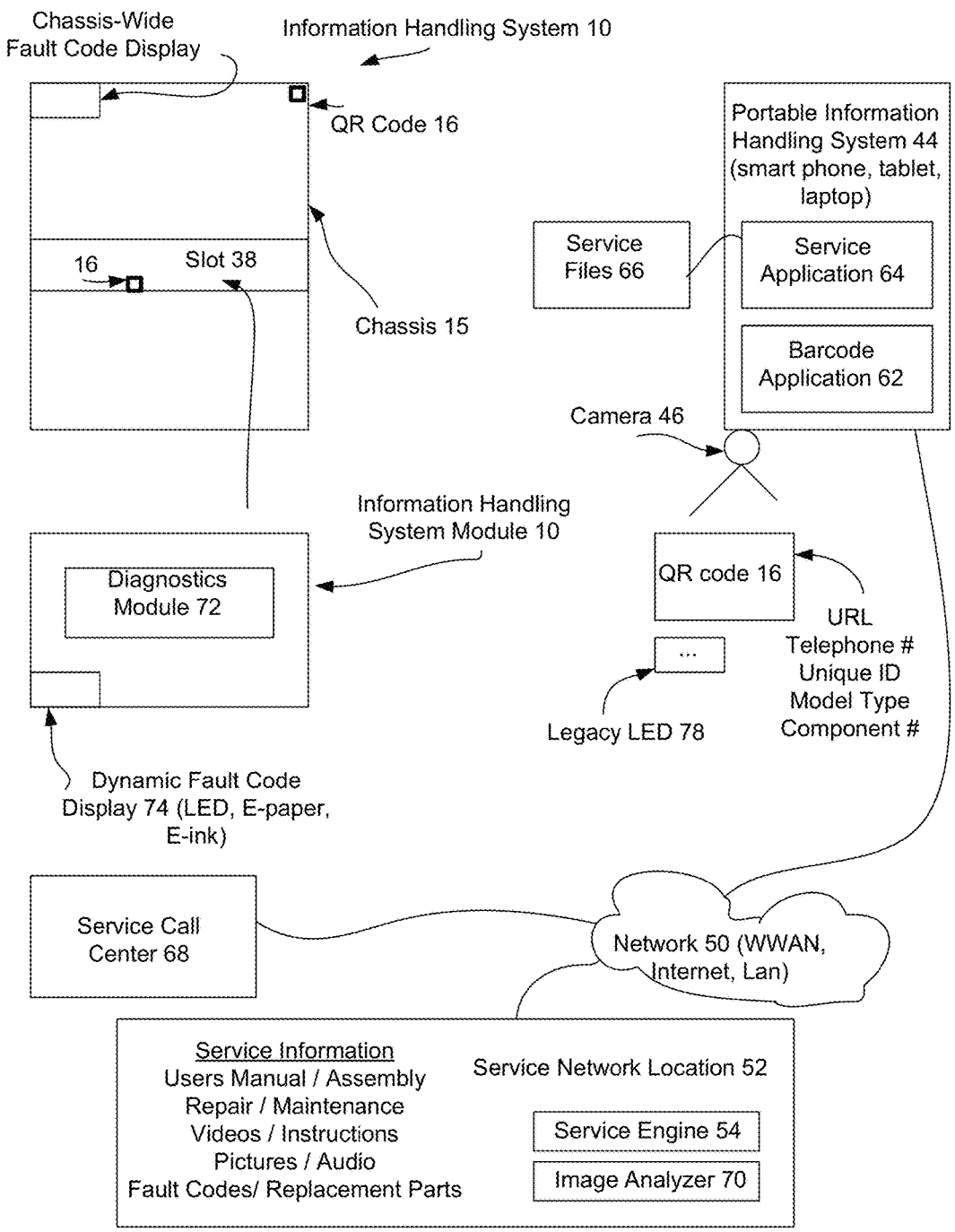
FIG. 4 depicts a block diagram of obtaining service information by reference to multi-dimensional barcodes associated with information handling system components.

In the example embodiment depicted by FIG. 4, chassis 15 is a rack that holds plural information handling system modules 10. Chassis 15 is shipped with plural slots 38, each slot accepting an information handling system module 10 with a set of opposing rails 36 that slide the module into and out of the chassis. Chassis 15 and information handling system modules 10 arrive at an end user location 40 after shipment from manufacturer location 32. For example, at end user location 40, an end user assembles information handling system modules 10 into chassis 15 using rails 36 and including other types of components, such as a hard disk drive 26. Once information handling system modules 10 are assembled in chassis 15, the end user loads applications from storage media, such as an operating system from an optical disc 42, to bring the information handling system modules to an operational state. To aid in the assembly at chassis 15, the end user has a portable information handling system 44, such as a portable cellular "smart" phone, a laptop portable information handling system or tablet information handling system that communicates through a wireless wide area network, local area network or similar network link. Portable information handling system 44 includes a camera 46 that captures QR codes 14 attached to the chassis and components. Portable information handling system 44 also includes a Global Positioning System (GPS) locator that provides the location of the system 44. Portable information handling system 44 in combination with the QR codes provides enhanced digital content to instruct and demonstrate assembly of components into chassis 15 at end user location 40.

To obtain enhanced service content for assembly of components at chassis 15, the end user captures an image of a QR code for a component of interest with camera 46 to extract service identifiers from the QR code and communicates the service identifiers through a network 50, such as the Internet, to a service network location 52. A service engine 54 at service network location 52 retrieves service information associated with the captured QR code service identifiers and presents service information to the end user from service network location 52 through network 50 to portable information handling system 44. For example, an end user seeking additional instructions for assembly of an information handling system module 10 to rails 36 captures the QR code of the module 10 and rails 36 to send the associated service identifiers to service network location 52. Service engine 54 applies the service identifiers to retrieve and present a video that demonstrates assembly of module 10 and rails 36. As another example, an end user captures an image of a QR code 16 attached to an operating system storage media 42 to obtain instructions for installing the operating system or a link to an image originally installed on the information handling system module 10 associated with the operating system. Service information may be retrieved based upon a single service identifier from a single QR code or from a combination of service identifiers. For example, a service identifier for a rail 36 will retrieve a selection of demonstrations for the use of the rail while a combination of a rail and module service identifiers will retrieve a video for assembly of a module to the rail.

In addition to enhanced service label content, a QR code service identifier aids in the inventory and tracking of equipment at installation, throughout normal operations and for replacement at end-of-life. For example, GPS 48 of portable information handling system 44 provides position information for the location at which a QR code 14 is imaged so that the position of products can be tracked at a mapping engine 56 of service network location 52. A chassis controller 58 of chassis 15 communicates with a baseboard management controller 28 of an information handling system module 10 to aid in tracking of network address information for the module 10. Mapping engine 56 ties latitude and longitude information from GPS 48 with network address information, such as IP and MAC address information, coordinated by chassis controller 58 to generate a map of the physical location of an information handling system module and network address location. In one embodiment, each slot 38 of chassis 15 has a QR code 16 with a service identifier that identifies the slot position in chassis 15 to aid in mapping a physical location inventory. Service label 12 for a slot 38 rotates out into the slot when the slot is empty for ready access by a camera 46 and is pushed to rotate to a hidden position when an information handling system module 10 is pushed into the slot 38. In one embodiment, service label 12 rotates to bring QR code 16 into view of a transparent region 60 of chassis 15 so that an end user can capture an image of a slot QR code 16 when an information handling system module 10 is installed in a slot 38. For example, a QR code 16 is placed on the front side and back side of service label 12 so that the QR code 16 can be captured from the back side of service label 12 through the transparent region 60 when a module 10 is installed in slot 38. Alternatively, QR code 16 is itself transparent so that a camera image captured from the back side through transparent region 60 is electronically inverted at portable information handling system 44 to allow extraction of a service identifier from an image of the back side of service label 12.

Referring now to FIG. 4, a block diagram depicts obtaining service information by reference to multi-dimensional barcodes associated with information handling system components. In the example embodiment depicted by FIG. 4, information handling system 10 consists of plural information handling system modules 10 that insert into slots 38 of a chassis 15, such as server rack or blade chassis. An end user obtains enhanced service information for information handling system 10 by capturing with a portable information handling system 44 an image of selected multi-dimensional barcodes, such as QR codes 14, affixed at or near components of information handling system 10. For example, each QR code 14 can include a variety of service identifiers that enhance service information presented at labels immediately view able by an end user. Some examples of service identifier information embedded in a QR code include a URL for a model, end user or system specific website that presents service information; a telephone number for a call center with the number applicable to a service or warranty level of the information handling system; a unique identifier for the information handling system, component or end user associated with the system; a model type for the information handling system and/or component; and a component part number. To obtain enhanced service information, an end user captures an image of the QR code 14 with camera 46 of portable information handling system 44 to extract the service identifier, and applies the service identifier to retrieve enhanced service content through network 50. In one embodiment, a barcode application 62 extracts a URL for use by a browser of portable information handling system 44. In an alternative embodiment, a service application 64 receives the service identifier to perform specialized service functions with the service identifier, such as adding end user password information to a request for service, retrieving service files for presentation from local memory of portable information handling system 44, or processing service identifiers to present service options to an end user like self-help or contacting a service call center 68.

Some examples of enhanced service provided by service application 64 include coordination of service information for a specific information handling system 10 for presentation at portable information handling system 44 based upon service identifiers extracted from one or more QR codes of the specific information handling system 10. For example, service application 64 contacts a service network location 52 using a URL extracted from a QR code 14 and applies a unique identifier extracted from the QR code 14 to obtain warranty information for the system; a user's manual for the system; assembly, repair and maintenance instructions for the system; video demonstrations of service functions performed at the system, pictures of the system, replacement suggestions for the system; audio instructions for service functions performed at the system; and fault codes indicated to identify faults at the system. In one embodiment, service engine 54 of service network location 52 includes an image analyzer 70 that accepts images capture by a camera to allow extraction of service identifiers from a QR code sent as an image to service network location 52. In one alternative embodiment, an image sent to image analyzer 70 can include plural QR codes each of which are analyzed to extract service identifiers. For example, a single high resolution picture of a chassis 15 having a QR code and plural information handling system modules, each having a QR code, allows image analyzer 70 to determine a unique identifier of a chassis and all information handling system modules installed in the chassis.

In one embodiment, a QR code 14 is generated for presentation at a configurable display to dynamically present service information with the display. For example, a diagnostics module 72 running on components of an information handling system module 10 generates a service identifier and presents the service identifier with an inexpensive LED or electronic paper display 74 by embedding the service identifier in a QR code of the display 74. The service identifier generated by diagnostics module 72 includes a diagnostics code that indicates the results of an analysis performed by diagnostics module 72 of components running on the information handling systems module 10. In one embodiment, each information handling system module 10 in chassis 15 has its own dynamic diagnostics display 74 that presents diagnostics codes with a QR code based upon diagnostics performed at a diagnostics module 72 of each information handling system module 10. In an alternative example, a chassis-wide dynamic fault code display 76 presents diagnostic codes for plural information handling system modules supported by the chassis 15, with the QR code dynamically presented to include a unique identifier of the module associated with the fault code. A chassis controller coordinates the presentation of diagnostics for each information handling system module with the shared chassis-wide dynamic fault code display 76.

When a dynamic QR code is generated at a display 74 or 76, an end user can determine the fault detected by diagnostics by capturing an image of the QR code at the display with a camera of portable information handling system 44 and extracting the diagnostics code from the QR code. Service application 64 coordinates the gathering of relevant information for addressing the diagnostics code by presenting at portable information handling system 44 the meaning of the diagnostics code and providing a user interface for access to additional service information based upon service identifiers extracted from the QR code. For example, service application 64 coordinates access to self-help video demonstrations from service network location 52 or a telephone/chat session with a service call center 68 based upon the type of fault detected and a service level of the end user. If, for instance, a CPU failure is detected by diagnostics and presented in a QR code service identifier, the end user interface presents the failure and automatically retrieves a video form service network location 52 that demonstrates CPU replacement. Further, the user interface presents an order page to allow the end user to order a new CPU with the order page populated by compatible parts information based upon the system unique identifier and system configuration information retrieved from service network location 52. In one embodiment, service application 64 includes logic that captures legacy diagnostics information, such as LED diagnostics indicators or textual information written at the information handling system, such as interpreting textual information that specifies a model type of unique identifier of the information handling system. The legacy information aids in the repair or replacement of information handling systems and components that do not include a QR code with service identifiers.

As an information handling system approaches end of life, components may begin to fail and, eventually, the end user will want to replace the information handling system. Service application 64 coordinates replacement of failed components and end-of-life information handling systems by applying service identifiers extracted from QR codes associated with an information handling system and components of the information handling system. Service application 64 uses the service identifiers to retrieve service information from service network location 52 and applies the service information to present a user interface to an end user with service function options. For example, in response to a dynamic QR code that indicates a hard disk drive failure at an information handling system module, service application 64 retrieves warranty information to determine if the failure is covered by warranty, and if so, initiates a telephone call to a service call center 68 to obtain manufacturer warranty service replacement of the hard disk drive. If warranty coverage is not provided, service application 64 retrieves the system configuration from service network location 52 to determine an appropriate replacement hard disk drive and presents an order page for the replacement part to the end user by inserting the users account and password information. In one embodiment, service application 64 contacts service engine 54 to initiate remote diagnostics for the hard disk drive to confirm that a failure has occurred. If a system failure requires replacement of an entire information handling system, service application 64 coordinates preparation of an order form for a compatible replacement based upon the service information of the legacy system as determined by the service identifiers embedded in the QR code of the legacy system.

Although the present invention has been described in detail, it should be understood that various changes, substitutions and alterations can be made hereto without departing from the spirit and scope of the invention as defined by the appended claims.

What is claimed is:

1. A system to aid service of an information handling system, the system comprising:
   a service label presented at the information handling system and having a two-dimensional barcode, the two dimensional barcode having a service identifier that includes at least a universal resource locater and a unique identifier;

a portable information handling system having a processor, a camera and a barcode application interfaced with the camera, the camera operable to take an image of the two-dimensional barcode, the processor running the barcode application, the barcode application operable to analyze the image to retrieve the service identifier;

a service application interfaced with the barcode application and operable to apply the service identifier to retrieve service information from a network location through a network interface that provides service for the information handling system, the retrieved service information including at least a visual image retrieved from the network location of plural components disposed on a motherboard that match the plural components of the information handling system, the visual image presented in a browser and providing a display presentation at the portable information handling system having images of the plural components disposed on the motherboard, the images of the plural components individually selectable to obtain service information of an associated of the plural components including at least a video that depicts replacement for the associated one of the plural components that is selected.

2. The system of claim 1 wherein the service identifier comprises a universal resource locator for a network location associated with a manufacturer of the information handling system and the service information comprises instructions for performing maintenance at the information handling system for the associated component, and wherein the image captured by the camera includes plural individually illuminated diagnostic LEDs that provide a diagnostic code, the service application analyzing the individually illuminated diagnostic LEDs to determine the diagnostic code and providing the diagnostic code to the network location.

3. The system of claim 2 wherein the instructions comprise a user's manual for the information handling system.

4. The system of claim 1 wherein the portable information handling system comprises a wireless telephone that communicates with the Internet over a wireless wide area network, the service identifier comprises an Internet address and the service information comprises a video that presents instructions for replacing the associated component of the information handling system.

5. The system of claim 1 wherein the portable information handling system comprises a wireless telephone that communicates with the Internet over a wireless wide area network, the service identifier comprises telephone contact information and the service information comprises audio that presents instructions for replacing a component of the information handling system.

6. The system of claim 1 wherein the portable information handling system comprises a laptop, the service identifier comprises a file stored on the laptop and the file comprises a video that presents instructions for correcting a failure at the information handling system.

7. The system of claim 1 wherein the service application is further operable to retrieve service information for the information handling system by providing the unique identifier to a website of the universal resource locator.

8. The system of claim 7 wherein the service information comprises warranty information for manufacturer warranty repair of the information handling system.

9. The system of claim 7 wherein the portable information handling system comprises a portable telephone and the service information comprises a telephone call to a manufacture service representative.

10. A method to aid service of an information handling system, the method comprising:
capturing an image of at least a portion of an information handling system with a camera integrated in a portable information handling system, the image including at least a service label having a bar code, the barcode having a unique identifier and a service network location;
analyzing the image with the portable information handling system to determine the unique identifier of the information handling system;
sending the unique identifier of the information handling system from the portable information handling system through a network to the service network location;
responding to the unique identifier at the service network location by sending service information for the information handling system to the portable information handling system, the service information including at least an image of the information handling system that depicts processing components of the information handling system disposed on a motherboard; and
presenting the service information with a browser of the portable information handling system, including presenting an image of the plural components disposed on the motherboard included in the information handling system based upon the unique identifier, each component selectable by pressing on a depiction of each component in the image, selection of a depiction of a selected component causing retrieval through the network of a video depicting replacement of the selected component.

11. The method of claim 10 wherein the captured image comprises a multi-dimensional bar code having a service network location address, analyzing the image comprises determining the service network location address at the portable information handling system by analyzing the multi-dimensional bar code, and sending the identity information comprises contacting the service network location address.

12. The method of claim 11 wherein the multi-dimensional bar code further comprises a unique identifier for the information handling system, sending the identity information further comprises sending the unique identifier to the service network location address, and responding to the identity information further comprises using the unique identifier to present an image at the portable information handling system having components associated with the unique identifier.

13. The method of claim 11 wherein the multi-dimensional bar code further comprises a component part number for the information handling system, sending the identity information further comprises sending the component part number to the service network location address, and responding to the identity information further comprises using the component part number to present service information from a service network location associated with the component part number.

14. The method of claim 13 wherein the component part number comprises a CPU part number and the service network location comprises instructions for replacing the CPU at the information handling system.

15. The method of claim 10 wherein the captured image comprises plural LEDs disposed at a housing of the information handling system, the LEDs individually illuminated in one of plural configurations to present a diagnostics code, the service information comprising service instructions associated with the LED diagnostics code.

16. The method of claim 10 wherein the portable information handling system comprises a portable telephone and the service information comprises a telephone connection to a service call center.

17. The method of claim 10 wherein the portable information handling system comprises a portable telephone and the service information comprises a video demonstrating a service action at an information handling system.

18. The portable information handling system of claim 1 wherein the service information is applied by the network location to initiate a remote access of the information handling system to perform a system diagnostics of the information handling system.

19. The method of claim 10 further comprising initiating a remote access from the service network location to perform system diagnostics in response to a selection from the portable information handling system of a component.

* * * * *